(12) United States Patent
Karlsson et al.

(10) Patent No.: US 7,933,924 B2
(45) Date of Patent: Apr. 26, 2011

(54) DOCUMENT OBJECTS

(75) Inventors: Måns Jonas Daniel Karlsson, Rochester, NY (US); James Walter Reid, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 257 days.

(21) Appl. No.: 11/457,530

(22) Filed: Jul. 14, 2006

(65) Prior Publication Data

US 2008/0016078 A1    Jan. 17, 2008

(51) Int. Cl.
    *G06F 17/30* (2006.01)
(52) U.S. Cl. .......... 707/783; 707/795; 707/796
(58) Field of Classification Search .......... 707/783, 707/795, 796, 9, 100–102; 235/494; 717/115; 358/1.15
    See application file for complete search history.

(56) References Cited

U.S. PATENT DOCUMENTS

| | | | |
|---|---|---|---|
| 5,453,605 A | 9/1995 | Hecht et al. | |
| 5,572,010 A | 11/1996 | Petrie | |
| 5,930,801 A | 7/1999 | Falkenhainer et al. | |
| 5,939,703 A * | 8/1999 | Hecht et al. | 235/494 |
| 6,507,848 B1 | 1/2003 | Crosby et al. | |
| 6,582,474 B2 | 6/2003 | LaMarca et al. | |
| 6,845,376 B1 * | 1/2005 | Johnson | 707/100 |
| 6,892,201 B2 * | 5/2005 | Brown et al. | 707/9 |
| 7,330,282 B2 * | 2/2008 | Matsumoto | 358/1.15 |
| 2001/0025281 A1 * | 9/2001 | Hirayama | 707/9 |
| 2006/0059462 A1 * | 3/2006 | Yamamoto | 717/115 |

OTHER PUBLICATIONS

U.S. Appl. No. 11/148,130, filed Jun. 8, 2005, Walker et al.
U.S. Appl. No. 11/300,974, filed Dec. 15, 2005, Sperry.

* cited by examiner

*Primary Examiner* — Mohammad Ali
*Assistant Examiner* — Huawen Peng
(74) *Attorney, Agent, or Firm* — Pepper Hamilton LLP

(57) ABSTRACT

A document object includes informational elements and at least one attribute corresponding to a first document, and a sub-object corresponding to a second document. The sub-object includes informational elements and at least one attribute corresponding to the second document. Optionally, the second document may be a subset of the first document. Any of the attributes may include elements such as an access right, operation, informational element, internal state indicator and/or work low instruction. The document object is stored in a manner such that when the document object is decompressed, the sub-object remains compressed until it is also decompressed.

20 Claims, 5 Drawing Sheets

DOCUMENT OBJECTS

CROSS-REFERENCE TO RELATED APPLICATIONS

Not applicable.

STATEMENT REGARDING FEDERALLY SPONSORED RESEARCH

Not applicable.

NAMES OF PARTIES TO A JOINT RESEARCH AGREEMENT

Not applicable.

SEQUENCE LISTING

Not applicable.

BACKGROUND

1. Technical Field

The disclosed embodiments generally relate to the field of documents and files containing embedded information.

2. Description of the Related Art

In environments in which multiple users share or exchange data in the form of documents or document files, there is a need to permit the multiple users to access a particular document in a "public space" available to all, or to retrieve or copy a portion of a document on a personal computer or printing device. Similarly, there is a need for a mechanism by which a user who has created a document or file can place the work in a public space to be viewed by others, and if desirable edited by others. At the same time, it is desirable, in a shared-files system, to have some mechanism for security with respect to publicly available documents, so that there can be some order and control over the contents of documents.

One method of providing security in a document access system is to associate an object with each individual file that is contained in a file system. An "object" is a set of computer-readable code that describes access properties (e.g., read and/or write permissions), hierarchical relations, and/or other properties of the file. The object may be permanently associated with the file. Whenever a user desires to access a file, the document access system first locates the object for that file and performs one or more tasks based on the content of the object. For example, the tasks may include retrieving the requested file, identifying or retrieving related file, or determining what rights the user has to access and/or modify the file. An example of such a system is disclosed in U.S. Pat. No. 5,930,801, the disclosure of which is incorporated herein by reference in its entirety.

In a physical document, the object data may be contained in, or the object may be located based on information contained in, an embedded data block (EDB) that is printed on the document. An EDB is a two-dimensional image symbology for the storage and retrieval of data. EDBs are composed of embedded data characters, some of which are encoded to define a synchronization frame and others of which are encoded to carry user/application-specific information. Patents relating to the encoding of EDBs include U.S. Pat. Nos. 5,453,605, 5,449,896, 5,572,010, 5,862,271, and 5,939,703, the disclosures of each of which are incorporated herein by reference.

One example of an EDB is a glyph block. Glyph blocks encode information, for example, text, data and graphics, in thousands of tiny glyphs. Other types of EDBs include, and are not limited to, bar codes, watermarks, and other embedded computer-readable images or text.

Prior art object-based and EDB-based management systems only permit the relation of one document to an object. In the prior art, there has been no mechanism to allow for the inclusion of a structured collection of documents, or individual portions of documents, each potentially with its own state, access rights, operations and/or workflow information, within a single object.

The disclosure contained herein describes attempts to address one or more of the problems described above.

SUMMARY

In an embodiment a document object includes informational elements and at least one attribute corresponding to a first document, and a sub-object corresponding to a second document. The sub-object includes informational elements and at least one attribute corresponding to the second document. Optionally, the second document may be a subset of the first document. Any of the attributes may include elements such as an access right, operation, informational element, internal state indicator and/or workflow instruction. In some embodiments, the document object is stored in a compression container, such that when the document object is decompressed, the sub-object remains compressed until it is also decompressed.

Optionally, the object may be represented as an embedded data block on a physical document. Alternatively, the object may be represented as a computer-readable file.

In another embodiment, a method of generating a document object includes storing first data representative of content of the first document in a memory; compressing the first data into a sub-object; storing the second attribute as second data and the sub-object in a memory; and compressing the second data and the sub-object into an object. The method also may include encrypting the first data before it is compressed, and encrypting the second data before it is compressed. The method also may include receiving a first attribute corresponding to the first document, and receiving a second attribute corresponding to the second document. The first compressing also may include comprises compressing the first attribute with the first data into the sub-object, while the second compressing step also may include compressing the second attribute with the second data and the sub-object into the object. In some embodiments, the method also may include printing an embedded data block on a physical document, wherein the embedded data block is representative of the object. Attributes may include items such as access rights, operations, informational elements, internal state indicators or workflow instructions.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Figure 1:
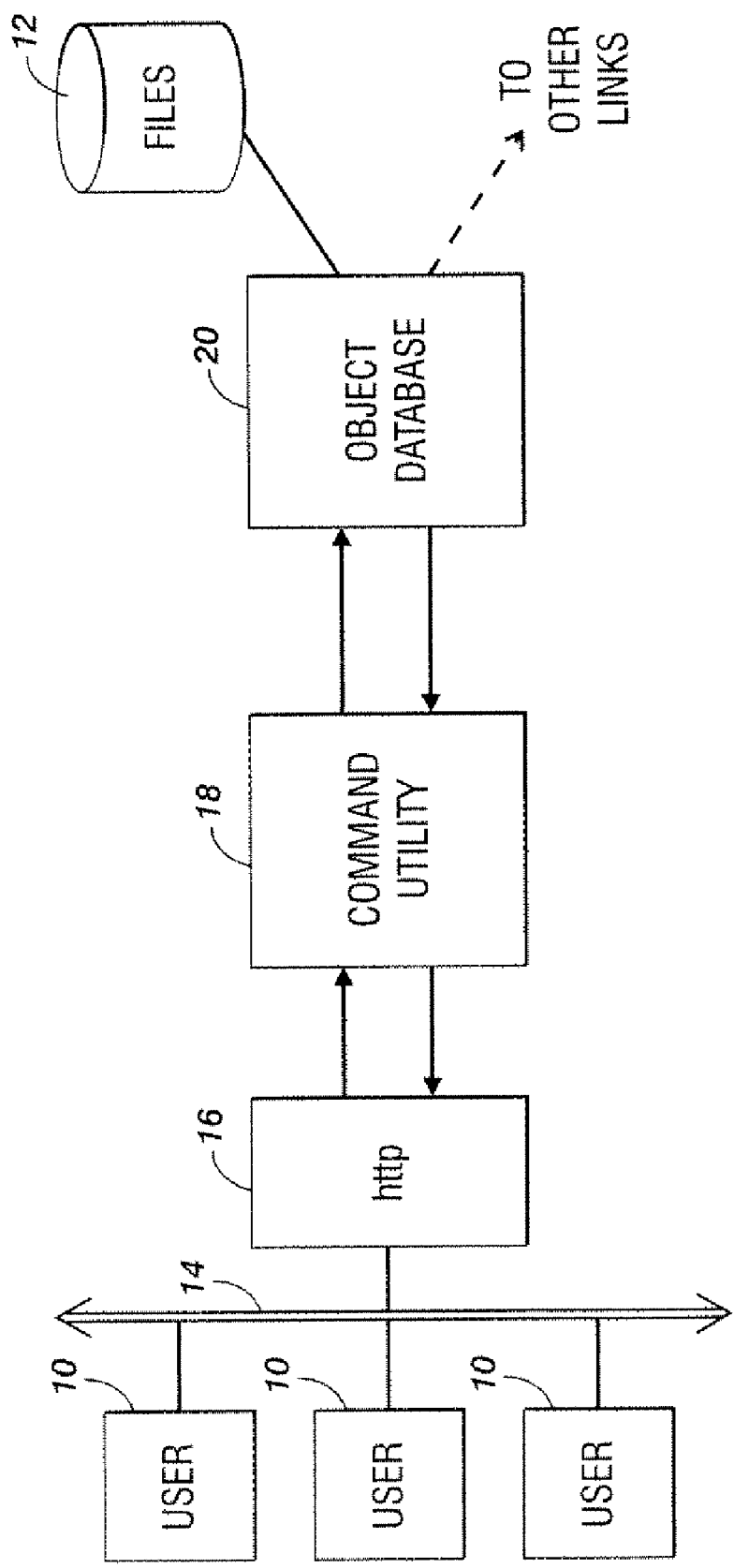
FIG. 1 is a block diagram of an exemplary document sharing environment.

In addition, in the following discussion, a "document" is a physical document or electronic file containing text and/or images that may be retrieved for viewing, editing or copying, such as in a word-processing, graphics, or spreadsheet format. An "object" is a smaller piece of computer-readable code which represents certain persistent attributes of a document. An object may be used to recreate a document that has been saved or stored in electronic form. An object includes information representative of the document's content, or it may also include one or more as attributes (i.e., elements descriptive of the internal state of the document), as well as operations (as described below). A "workflow" is series of steps, implemented by one or more electronic systems, that direct and monitor the flow of a document between multiple individuals and devices FIG. 1 is a block diagram of an exemplary document sharing environment. A purpose of the environment may be to allow any number of users, here each indicated as 10, access to various files, such as word-processing or spreadsheet documents, stored in a file system 12. File system 12 may be in the form of, for example, a database, hard drive, computer-readable memory or network server. Each user 10 has access to a document delivery device such as a personal computer, laptop, electronic book, personal digital assistant, television fax machine, photocopier, printer or other device that is connected via a network 14 to a document server 16. For example, but without limitation, the server 16 may be a hypertext transfer protocol (http) server, accessed over the network 14 by a browser on the delivery device of each user 10.

Individual documents may be maintained in a file storage system 12. Each document for which access control is desired is associated with an object, which may be maintained in the file storage system 12 with the document, or which may be maintained in a separate object database 20. The object may include information such as access properties (read and/or write permissions), hierarchical relations, and other properties of the document. Additional examples of possible elements of an object are described below.

When a user 10 desires to access a document from the file storage system, the server 16 may communicate with or contain what is here called a command utility 18. The command utility 18 is one or more programs or subroutines that include commands that influence an object. For example, when receiving a request for a document, the command utility 18 may call the object that is associated with the document, use the object to determine what rights the user has to access and/or modify the document, or implement a workflow that is triggered by the document request. Examples of such a workflow include the concurrent delivery of related documents, or the generation of an alert indicating that the document is being accessed.

Alternatively, if a user 10 desires to create a new document, the user may submit the document to the file storage system 12 through the server and with a command such as "add file" or "create file." In response to this request from a user 10, the command utility 18 may then send back to the user 10 a request for object information, such as access permissions or workflow instructions. This request may be in the form of a survey, checklist, drop-down menu, or any other form that allows the user to enter relevant object information for the document.

Further, if the user 10 has a physical document that includes an EDB, the user's device may read the EDB and transmit the EDB data to the command utility 18, and the command utility may retrieve and implement the appropriate object for the physical document, if the object is available in the objects database 20. For example, if a user desires to photocopy an EDB, the command utility 18 may determine whether the user has exceeded a predetermined copy limit for the document, or the command utility may determine the user's access permissions and only copy certain portions of the document based on those permissions.

Figure 2:
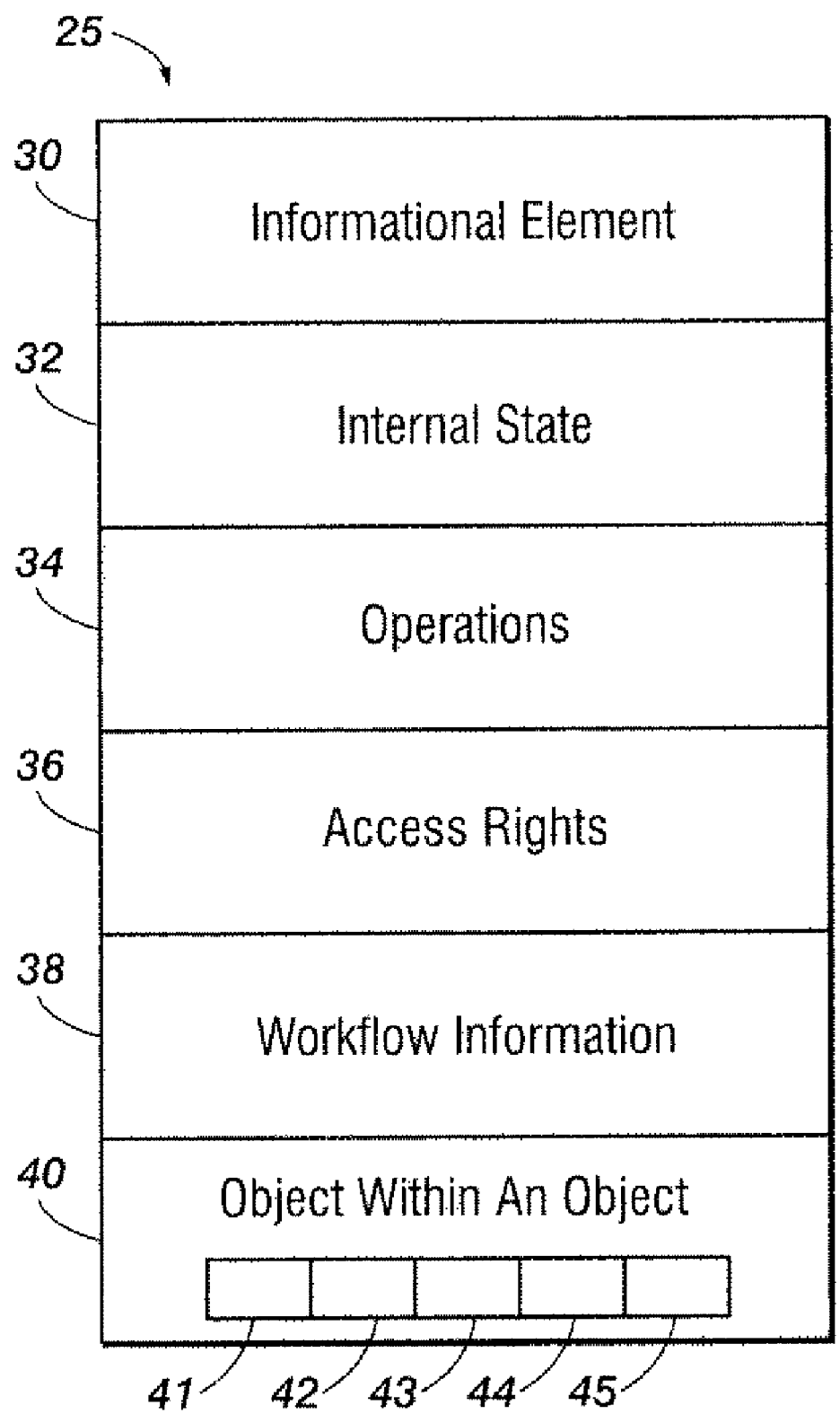
FIG. 2 depicts exemplary elements of a document object.

Referring to FIG. 2, in an embodiment, an object may contain one or more of the following elements:

Informational Element 30: An informational element is a command, data structure element that communicates some or all of the content of the object's associated document by retrieving and delivering that content to the requestor. It may include text, images, or other information. For example, an informational element may include a title, abstract, thumbnail, file name, or any other information relating to the content of the document.

Internal State 32: As informational element is a command, data structure or other element that describes the state of the object's associated document at any point in its life cycle. Examples of an internal state of a document include attributes such as "original," "copy", "draft," "final," "working," "corrupt," "stable," "compromised," "printed," "scanned," and other status identifiers. Some elements of the internal state of a document may not be observable by a user of the document. For example, the internal state of a document may include metadata about or contained in the document.

Operations 34: An operation is a behavioral element or command to manipulate or change one or more informational elements or the internal state of the object's associated document, or to implement one or more workflow instructions on the document. Some operations may change the internal state of the document, and optionally may return some value to the requestor. Other operations may simply provide access to the informational elements in the document. Workflow instructions may provide instructions to provide specific sets of information, such as all or part of the associated document, to one or more person, entities or devices so that the other person, entity or device can approve, modify or process the information according to a predesigned work process.

Access Rights 36: Access right information provides controlled access to some or all of a document's informational elements or operations. For example, an access right may compare a requestor's identity and/or password to a database of permissions associated with the data, and the informational elements, operations, or workflow options available to a requester may be limited based on the requestor's access rights.

Workflow Information 38; If the object's document has an associated workflow, this element carries information about the workflow that the document is a part of. Documents that belong to a workflow contain information about what other workflow processes or processors the document expects to find in the environment where the workflow is executed.

Thus, an object may integrate such diverse technologies as two-dimensional barcoding or watermarking, digital rights management, digital notary services, electronic signatures, integration with rights management-enabled document repositories, and/or secure printers such as printers using Trusted Computer Platform Alliance (TCPA) or other appropriate security specifications.

As described above, an object may include informational elements, attributes (e.g., metadata, or other elements that represent internal state of the document) and operations (i.e., things that can be done to the object's associated document, or that can be done by using information from the associated document). This autonomous object provides a logical encapsulation of the document's content, attributes and operations by providing access to them only through use of the document's operations. These document operations preserve the invariants that characterize the integrity of the document.

For a physical document, a document object may be serialized by saving it onto a storage medium (such as a file or a memory buffer) and/or transmitted to another location as a series of bytes or in some human-readable format such as extensible markup language (XML). The serialized object may be encoded as an EDB (such as by using glyphs or two-dimensional barcode technology), and then embedded (for example, as a raster image representation) onto an existing document (such as by being made part of its raster image).

As shown in FIG. 2, an object 25 as described herein may also include another object 40. This second object 40, sometimes referred to herein as a sub-object, corresponds to another document having its own access rights 44. It may also have other attributes such as informational elements 41, internal state 42, operations 43, or work flow information 45.

By providing a sub-object with an object, multi-level document access control may be provided. For example, a high level object 25 may include access rights and informational elements about a certain book or other document. A sub-object 40 within that high level object 25 may include access rights and information elements for a single chapter within that book. Alternatively, the sub-object 40 may include access rights and informational elements for a related document, such as a document that is referenced in the operations of the high level object 25.

Figure 3:
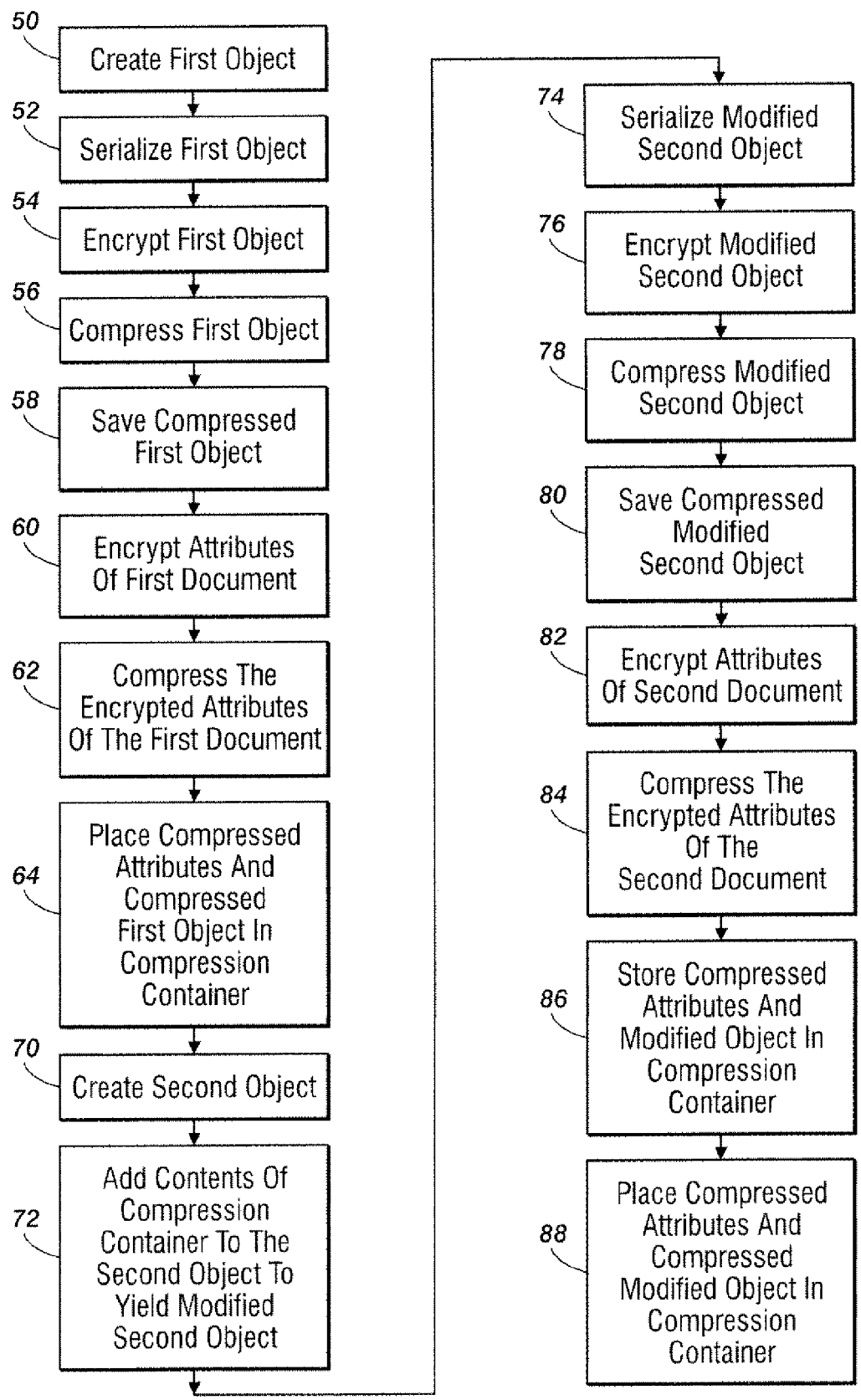
FIG. 3 is a flow diagram of an object creation process.

FIG. 3 illustrates exemplary steps that may be used to create a first object (or sub-object) within a larger second object. First, a user may create the first object 50 or identify the first object from an object repository. The first object itself includes informational elements representative of the content and/or operations of a document, and the object may be serialized 52 (i.e., saved or transmitted as a series of bytes), optionally encrypted 54 using any suitable encryption algorithm, and compressed 56 using a lossless or other compression mechanism such as compression into the ZIP file format. The resultant compressed first object is then stored 58 in a memory.

Each of the in-memory content item attributes of the first document may then be processed in a similar manner. For example, each attribute may be encrypted 60 using an encryption algorithm and/or compressed 62, with the resultant compressed data information being stored 64 in a memory. The compressed (and optionally encrypted) content item attributes and the serialized document object are placed in a container 64, i.e., a computer memory portion that holds the items, such as a ZIP file container or other lossless compression container. Thus, the document object represents content and/or operations for the first document, while the attributes represent internal state and/or operations for the first document. Together, the attributes and the object may be used to recreate the first document.

A second object corresponding to a content and/or operations for second document is then created 70 or identified. The second document may be totally separate from the first document, or it may represent a related document or a larger document within which the first document is included. The compression container and its contents are added to the new document object 72 as a name-item attribute pair (along with a "name" for the container) to create a modified second object.

The modified second object may then be serialized 74, optionally encrypted 76, and compressed 78. The resultant data is retained 80 in a memory. Each of the in-memory content item attributes of the second document may then be processed in a similar manner. For example, each attribute may be encrypted 82 using an encryption algorithm and/or compressed 84, with the resultant compressed data information being stored 86 in a memory. The compressed (and optionally encrypted) content item attributes and serialized document object may be placed in a container 88, i.e., a computer memory portion that holds the items, such as a ZIP file container or other lossless compression container and written to a computer-readable medium.

Figure 4:
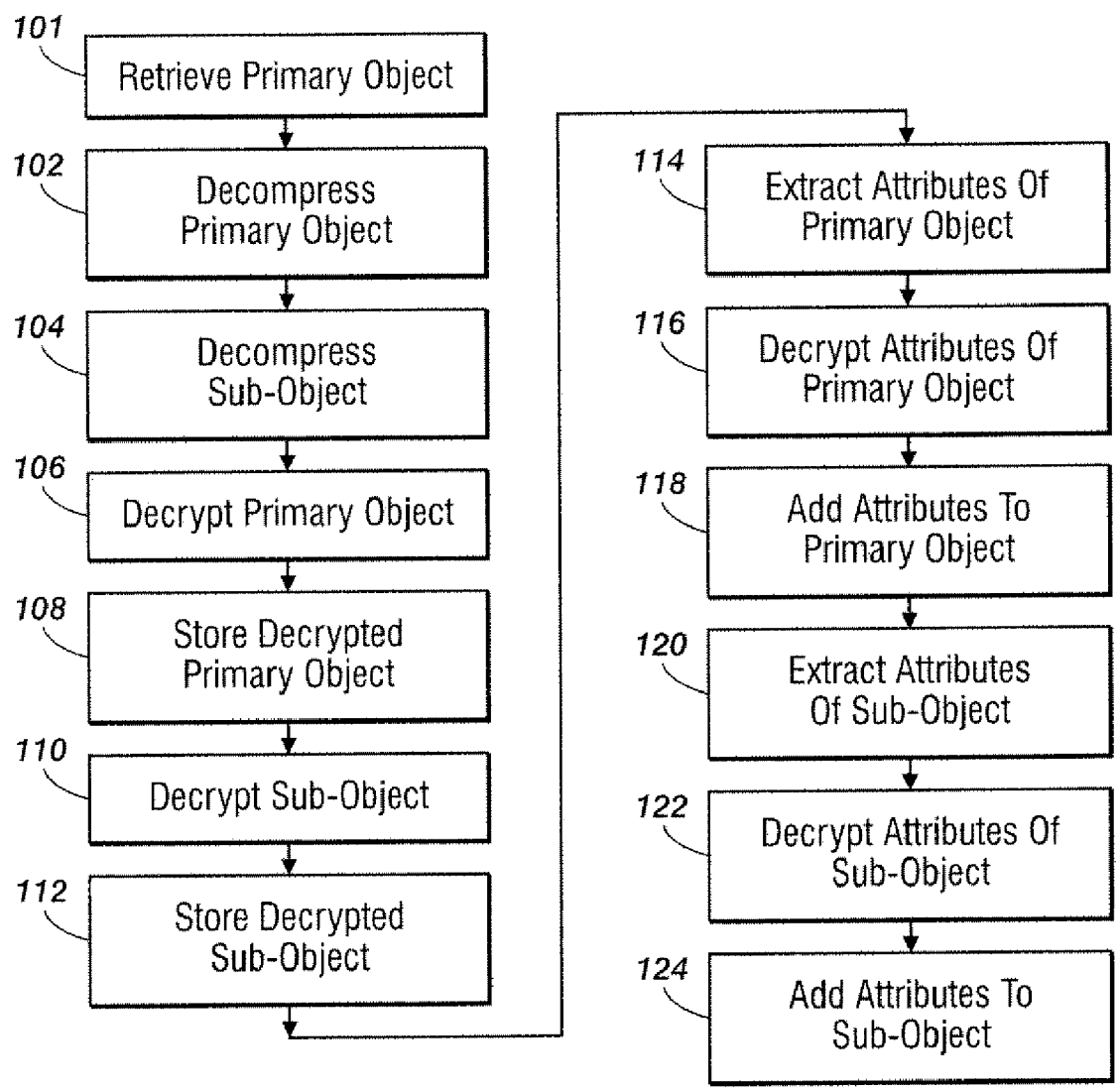
FIG. 4 is a flow diagram of an object retrieval process.

FIG. 4 illustrates exemplary steps that may be used to extract a sub-object from within an object. The "primary" object file may be read into a memory 101, such as a ZIP container, lossless compression container or cache where the primary object file may be decompressed 102 or otherwise extracted. At this point, the sub-object is still compressed, so the compressed sub-object is decompressed or otherwise extracted 104 into a memory from the compression container. The decompressed primary object and sub-object may be decrypted 106, 110 (if necessary), and an instance of each decrypted object (i.e., the decrypted primary object and the decrypted sub-object) may be stored 108, 112 in a cache, buffer or other memory, such as by using a class loader, such as a Java class holder.

The attributes for the primary object may then be decompressed 114, decrypted 116 and added 118 to the primary object as a name-item attribute pair. Similarly, the attributes for the sub-object may be decompressed 120, decrypted 122 and added 124 to the sub-object as a name-item attribute pair. At this point, each of the primary object and the sub-object may be restored to usable form.

Figure 5:
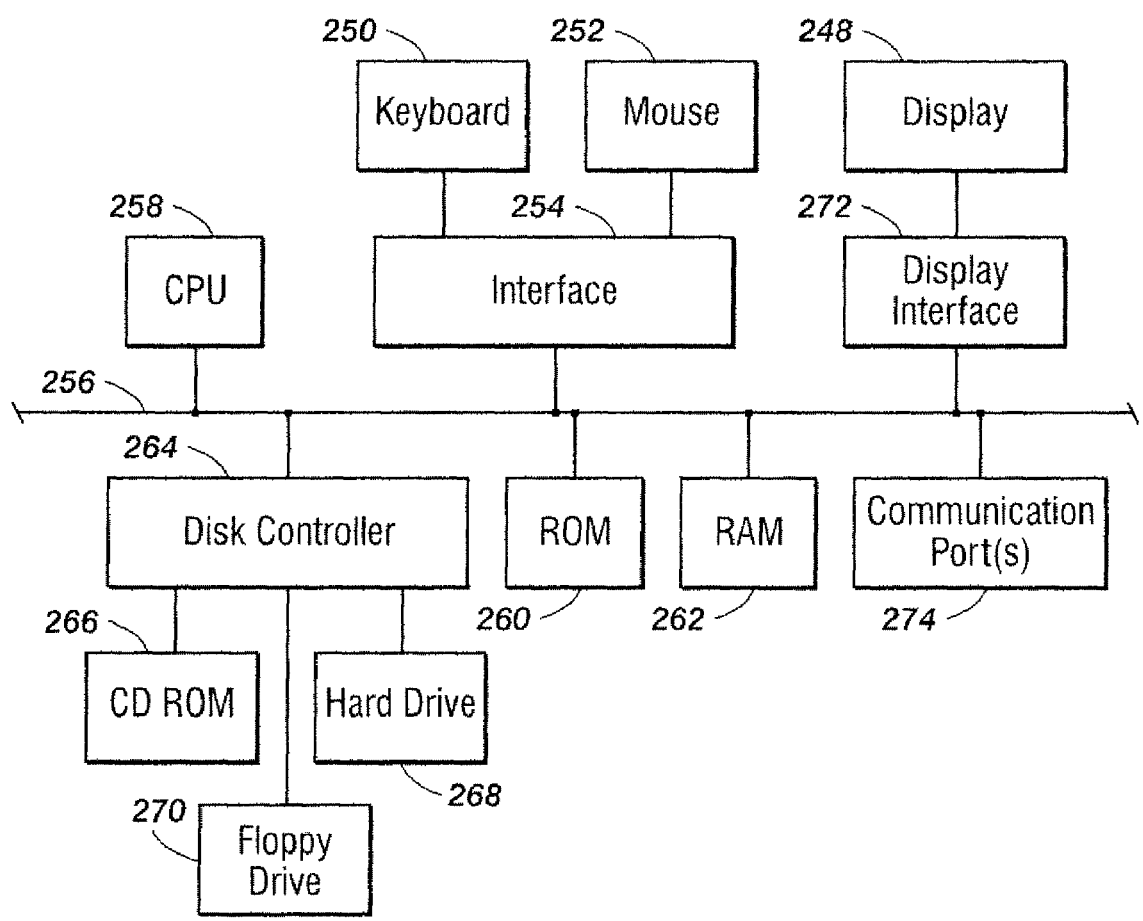
FIG. 5 is a block diagram of exemplary internal hardware that may be used to contain or implement the embodiments described herein according to an embodiment.

FIG. 5 is a block diagram of exemplary hardware that may be used to contain and/or implement the program instructions of a system embodiment. Of course, any electronic device capable of carrying out instructions contained on a carrier such a memory, signal, or other device capable of holding or storing program instructions may be within the scope described herein. Referring to FIG. 5, a bus 228 serves as the main information highway interconnecting the other illustrated components of the hardware. CPU 202 is a central processing unit of the system, performing calculations and logic operations required to execute a program. Read only memory (ROM) 218 and random access memory (RAM) 220 constitute exemplary memory devices.

A disk controller 204 may interface with one or more optional disk drives to the system bus 228. These disk drives may be external or internal memory keys, zip drives, flash memory devices, or other memory media such as 210, CD ROM drives 206, or external or internal hard drives 208. As indicated previously, these various disk drives and disk controllers are optional devices.

Program instructions may be stored in the ROM 218 and/or the RAM 220. Optionally, program instructions may be stored on a computer readable medium such as a floppy disk or a digital disk or other recording medium, a communications signal or a carrier wave.

An optional display interface 222 may permit information from the bus 228 to be displayed on the display 224 in audio, graphic or alphanumeric format. Communication with external devices may optionally occur using various communication ports 226. An exemplary communication port 226 may be attached to a communications network, such as the Internet or an intranet.

In addition to the standard computer-type components, the hardware may also include an interface 212 which allows for receipt of data from input devices such as a keyboard 214 or other input device 216 such as a remote control, pointer and/or joystick. A display including touch-screen capability may also be an input device 216. An exemplary touch-screen display is disclosed in U.S. Pat. No. 4,821,029 to Logan et al., which is incorporated herein by reference in its entirety.

An embedded system may optionally be used to perform one, some or all of the operations of the methods described. Likewise, a multiprocessor system may optionally be used to perform one, some or all of the methods described.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A document object embedded on a memory, comprising:
    a compression container comprising:
        a first compressed object comprising first informational elements and at least one attribute corresponding to a first document, wherein the first informational elements include data structure commands for retrieving and delivering some or all of the content of the first document and the at least one attribute corresponding to the first document comprises metadata that identifies an internal state and a status identifier of the first document, and
        a second compressed object corresponding to a second document, wherein the second compressed object comprises:
            second informational elements,
            at least one attribute corresponding to the second document, wherein the at least one attribute corresponding to the second document comprises metadata that identifies an internal state and a status identifier of the second document,
            an operational command configured to manipulate either the second informational elements or the at least one attribute corresponding to the second document, thus implementing one or more workflow instructions on the second document, and
            the first compressed object;
        wherein the second informational elements include data structure commands for retrieving and delivering some or all of the compressed second object's corresponding first or second document.

2. The document object of claim 1, wherein the second document is a subset of the first document.

3. The document object of claim 1, wherein:
    at least one of the attributes corresponding to the first document comprises an access right for the first document; and
    at least one of the attributes corresponding to the second document comprises an access right for the second document.

4. The document object of claim 1, wherein:
    at least two of the attributes corresponding to the first document comprise an informational element and an operation for the first document; and
    at least two of the attributes corresponding to the second document comprise an informational element and an operation for the second document.

5. The document object of claim 4, wherein:
    the attributes corresponding to the first document further comprise an access right for the first document; and
    the attributes corresponding to the second document further comprise an access right for the second document.

6. The document object of claim 1, wherein the document object is stored in the compression container, such that when the document object is decompressed, the second compressed object remains compressed until it is also decompressed.

7. The document object of claim 1, wherein the document object is represented as an embedded data block on a physical document.

8. The document object of claim 1, wherein the document object is represented as a computer-readable file.

9. The document object of claim 3, wherein at least one of the attributes comprises a workflow instruction for the attribute's associated document.

10. The document object of claim 1, wherein:
    at least one of the attributes corresponding to the first document comprise an access right for the first document; and
    at least one of the attributes comprises an access right for the attribute's associates document;
    at least one of the attributes comprises a workflow instruction for the attribute's associated document; and
    the document object is stored in a compression container, such that when the document object is decompressed, the sub-object remains compressed until it is also decompressed.

11. A method of generating a document object, comprising:
    storing first data representative of content of a first document in a memory wherein the first data includes first informational elements and at least a first attribute corresponding to the first document, wherein the first informational elements include data structure commands for retrieving and delivering some or all of the content of the first document and the at least one attribute corresponding to the first document comprising metadata that identifies an internal state and a status identifier of the first document, wherein the first data is stored in a first object;
    compressing the first object into a first compressed object;
    storing a second object in the memory, the second object comprising:
        the first compressed object, and
        second data comprising:
            second information elements,
            at least a second attribute corresponding to a second document, wherein the at least one attribute corresponding to the second document comprises metadata that identifies an internal state and a status identifier of the second document, and
            an operational command configured to manipulate either the second information elements or the at least one attribute corresponding to the second document, thus implementing one or more workflow instructions on the second document;
    compressing the second object into a second compressed object; and storing both the first compressed object and the second compressed object in a compression container in the memory, wherein the second informational elements include data structure commands for retrieving and delivering some or all of the compressed second object's corresponding first or second document.

12. The method of claim 11, further comprising:
encrypting the first data before it is compressed; and
encrypting the second data before it is compressed.

13. The method of claim 11 further comprising:
receiving a first attribute corresponding to the first document; and
receiving a second attribute corresponding to the second document;
wherein the first compressing step also comprises compressing the first attribute with the first object into the first compressed object; and
wherein the second compressing step also comprises compressing the second attribute with the second object into the second compressed object.

14. The method of claim 13, wherein:
the first attribute comprises an access right for the first document; and
the second attribute comprises an access right for the second document.

15. The method of claim 11, further comprising printing an embedded data block on a physical document, wherein the embedded data block is representative of the second compressed object.

16. The method of claim 11 further comprising:
encrypting the first data before it is compressed;
encrypting the second data before it is compressed;
receiving a first attribute corresponding to the first document; and
receiving a second attribute corresponding to the second document;
wherein the first attribute comprises an access right for the first document; and
wherein the second attribute comprises an access right for the second document; and further comprising:
printing an embedded data block on a physical document, wherein the embedded data block is representative of the second compressed object.

17. The method of claim 13, wherein the first attribute comprises an internal state indicator or a workflow instruction.

18. The method of claim 17, wherein the second attribute comprises an internal state indicator or a workflow instruction.

19. A document object embedded on a memory, comprising:
an embedded data block on a physical document that comprises:
a compression container comprising:
a first compressed object comprising first informational elements, at least one attribute corresponding to a first document, and an access right corresponding to the first document, wherein the first informational elements include data structure commands for retrieving and delivering some or all of the content of the first document and the at least one attribute comprises metadata that identifies an internal state and a status identifier of the first document, and
a second compressed object corresponding to a second document, wherein the second compressed object comprises:
second informational elements,
an access right corresponding to the second document,
at least one attribute corresponding to the second document, wherein the at least one attribute corresponding to the second document comprises metadata that identifies an internal state and a status identifier of the second document,
an operational command configured to manipulate either the second information elements or the at least one access right corresponding to the second document, thus implementing one or more workflow instructions on the second document, and
the first compressed object;
wherein the second informational elements include data structure commands for retrieving and delivering some or all of the compressed second object's corresponding first or second document.

20. The document object of claim 19, further comprising an informational element and an operation for the first document, and wherein the second compressed object further comprises an informational element and an operation for the second document.

* * * * *